May 30, 1967 R. M. VOITIK 3,322,430
GREASED "O" RING CARTRIDGE
Filed Aug. 4, 1965
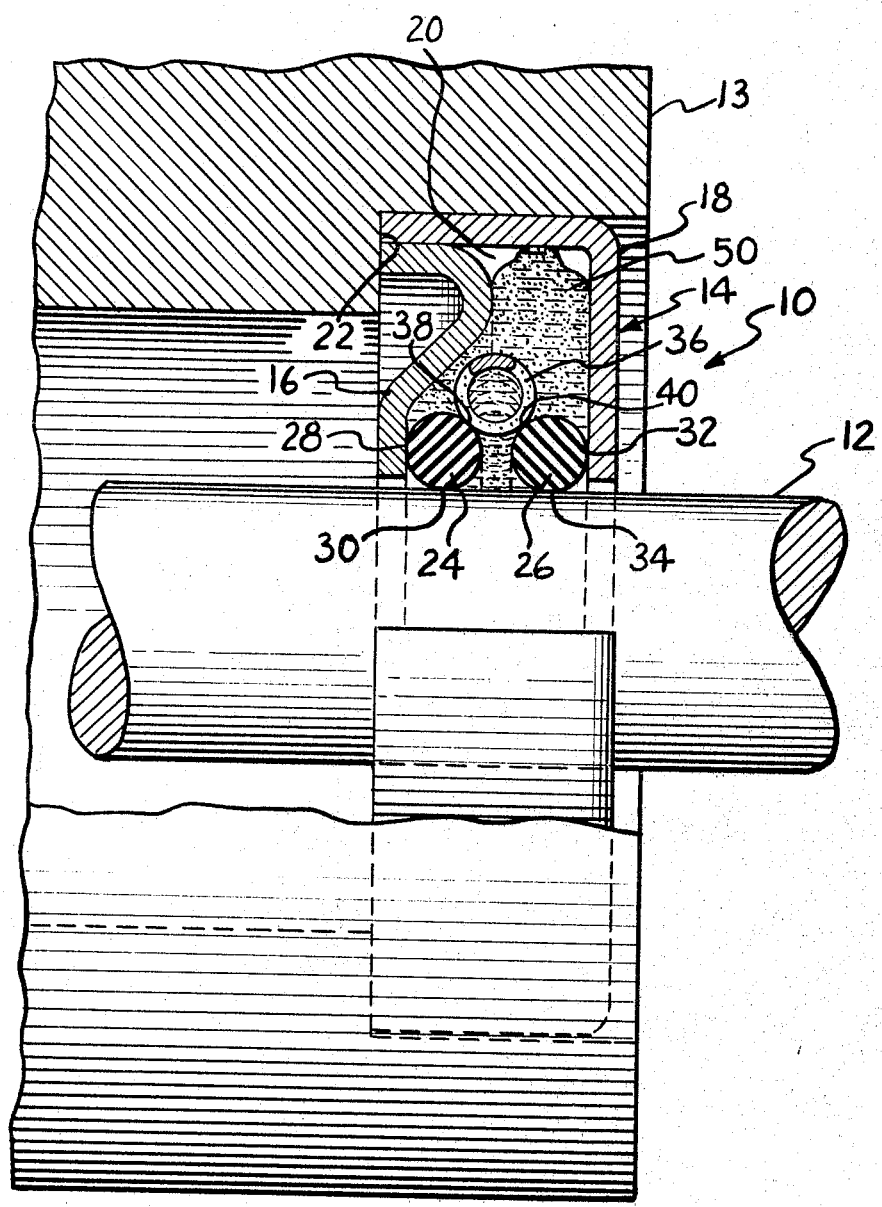
INVENTOR
ROBERT M. VOITIK
by: Wolfe, Hubbard, Voit & Osann
ATTYS.

United States Patent Office 3,322,430
Patented May 30, 1967

3,322,430
GREASED "O" RING CARTRIDGE
Robert M. Voitik, Glenview, Ill., assignor to Continental Illinois National Bank and Trust Company of Chicago
Filed Aug. 4, 1965, Ser. No. 477,218
4 Claims. (Cl. 277—41)

The present invention relates generally to gas and fluid sealing devices and more particularly concerns a rotary seal of an O-ring type for restricting leakage along a rotating shaft.

Many rotary seals relying on O-rings as the primary sealing elements have been designed. Such seals offer the advantages of simplicity and economy. However, it has been difficult in such seals to balance good sealing characteristics, requiring firm engagement between the O-ring and the shaft, with acceptable friction characteristics, resulting from snug engagement between the O-ring and the shaft. Too much friction causes excessive wear and undesirable heating.

It is therefore the primary aim of the present invention to provide a rotary O-ring type seal that effectively balances the objectives of sealing efficiency and acceptable friction between the sealing parts to produce a reliable, commercially acceptable product.

More particularly, it is an object of the invention to provide a seal of the above kind in which the O-ring sealing element can be proportioned to closely engage the rotating shaft for establishing a good seal, and the resulting friction is controlled through the novel seal assembly.

It is also an object to provide a rotary seal of the above character that maintains the advantages of simplicity and economy normally inherent in O-ring seals.

A further object is to provide a rotary seal as described above that simplifies seal design problems in that critical matching of shaft and O-ring sizes is not required.

Other objects and advantages of this invention will become apparent from reading the following detailed description and upon reference to the drawing, in which:

The single figure is, in general, an axial section taken through an O-ring sealing assembly constructed in accordance with this invention. For simplicity, only the upper half of the sealing assembly is illustrated.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Turning now to the single figure, there is shown a shaft assembly including a rotary seal 10 constructed in accordance with the present invention and arranged to restrict gas and fluid leakage through an annular space between a rotating shaft 12 and a housing 13. Preferably, the seal 10 is of the self-contained cartridge type and includes a casing 14 formed by an inner cup 16 and an outer cup 18 telescoped and secured together to define an inwardly opening annular space 20 that encircles the shaft 12. The casing 14 is seated in a recess 22 formed in the housing 13.

The sealing elements in the seal 10 are a pair of O-rings 24 and 26 positioned side-by-side within the space 20 so as to abut both an interior wall of the casing 14 and also the adjacent surface of the shaft 12. More particularly, the O-ring 24 abuts the inner cup 16 along a circle 28 and the shaft 12 along a circumference 30. Similarly, the O-ring 26 abuts the outer cup 18 along a circle 32 and the shaft 12 along a circumference 34. The O-rings 24, 26 may be formed of any conventional synthetic rubber-like material. It is preferred to utilize elastomeric materials and, more particularly, fluorocarbons such as "Viton."

To maintain good sealing engagement between the O-rings 24, 26 and the rotating shaft 12, an expanded garter spring 36 is positioned between the pair of O-rings within the space 20. The spring 36 acts along a line 38 on the O-ring 24 to insure positive sealing along lines 28 and 30. In similar fashion, the spring 36 acts on the O-ring 26 along a line 40 which insures positive sealing along lines 32 and 34. While a helical garter spring 36 has been shown in the illustrated embodiment, those familiar with the art will appreciate other O-ring biasing arrangements could be similarly employed.

In accordance with the invention, a quantity of light grease 50 is packed into the otherwise open portion of the space 20 so as to surround and be in heat transmitting contact with the O-rings 24, 26 and the spring 36. Preferably, the grease 50 is a common petroleum grease having a consistency when at normal room temperature of ordinary cold cream. The viscosity of the grease 50 should be sufficient to hold the packed grease in place during normal handling and installation of the seal 10.

In operation, rotation of the shaft 12 develops frictional heat where there is rubbing engagement of the O-rings. This heat is conducted from the O-rings by the spring 36 which tends to melt the petroleum grease 50, thereby dissipating the heat and allowing the melted grease to function as a lubricant and flow down to the O-rings. This results in the rubbing lines of sealing engagement being lubricated and thus controls the frictional heat which is continuously being generated. Not only is the frictional heat dissipated, but the friction is self-limiting. Higher friction develops more heat, which releases more lubricant to reduce the friction. Thus, the O-rings can be made to seal tightly with little danger from excessive friction.

While common petroleum grease is preferred for economy, any grease-like lubricant can be utilized which is capable of flowing at a temperature in the range of about 150° F. to about 300° F. The exact temperature is not critical but will depend, of course, on the particular application and the temperature encountered. The term "flowing" defines the condition wherein the viscosity of the grease is sufficiently reduced so that at least a portion of the grease acts as a liquid lubricant.

From the above description it is apparent that this invention provides an improved rotary seal which is capable of successful commercial operation. The utilization of the petroleum grease allows an easy and simple method of controlling the heat generation developed by the frictional heat resulting from the rubbing engagement of the O-rings. In addition, the flowing petroleum grease acts as a lubricant as regards the above-described rubbing engagements. This results in a sealing assembly in which an optimum amount of frictional engagement between the O-rings and the rotating shaft to produce effective sealing can be maintained.

Those familiar with the art will appreciate that the seal 10 is simple and well suited for economical production. Since pressure between the O-rings and the shaft can vary in the seal 10, design problems for a particular application are substantially simplified.

I claim as my invention:

1. In an assembly having a rotatable shaft passing through an opening in a housing, a rotary seal comprising, in combination, a casing mounted on said housing and defining an annular inwardly opening space surrounding said shaft, an O-ring fitted on said shaft within said space, a spring disposed in said space and bearing on said O-ring so as to urge it against both said casing and said shaft and a quantity of light grease in said space surrounding and in heat transmitting contact with said O-ring and said spring so that friction resulting from rotation of said shaft generates heat that is transmitted to said grease thereby causing grease to flow and lubricate the friction-producing rubbing parts.

2. In an assembly having a rotatable shaft passing through an opening in a housing, a rotary seal comprising, in combination, a casing mounted on said housing and defining an annular inwardly opening space surrounding said shaft, a pair of O-rings fitted on said shaft within said space, a spring disposed in said space and bearing on said O-rings so as to urge them against both said casing and said shaft and a quantity of light grease in said space surrounding and in heat transmitting contact with said O-rings and said spring so that friction resulting from rotation of said shaft generates heat that is transmitted to said grease thereby causing grease to flow and lubricate the friction producing rubbing parts.

3. In an assembly having a rotatable shaft passing through an opening in a housing, a rotary seal comprising, in combination, a casing mounted on said housing and defining an annular inwardly opening space surrounding said shaft, an O-ring fitted on said shaft within said space, a garter spring disposed in said space and bearing on said O-ring so as to urge it against both said casing and said shaft and a quantity of light grease in said space surrounding and in heat transmitting contact with said O-ring so that friction resulting from the rotation of said shaft generates heat that is transmitted to said grease thereby causing grease to flow and lubricate the friction producing rubbing parts.

4. In an assembly having a rotatable shaft passing through an opening in a housing, a rotary seal comprising, in combination, a casing mounted on said housing and defining an annular inwardly opening space surrounding said shaft, a pair of O-rings fitted on said shaft within said space, a garter spring disposed in said space and bearing on said O-rings so as to urge them against both said casing and said shaft and a quantity of light grease in said space surrounding and in heat transmitting contact with said O-rings and said garter spring so that friction resulting from rotation of said shaft generates heat that is transmitted to said grease thereby causing grease to flow and lubricate the friction producing rubbing parts.

References Cited

UNITED STATES PATENTS

| 2,570,117 | 10/1951 | Hallstrand | 277—4 X |
| 2,988,409 | 6/1961 | Fuhrmann | 277—141 |
| 3,069,174 | 12/1962 | Skinner | 277—48 |

FOREIGN PATENTS

| 1,040,859 | 10/1958 | Germany. |
| 725,214 | 3/1955 | Great Britain. |

SAMUEL ROTHBERG, *Primary Examiner.*